US008870477B2

(12) United States Patent
Merminod et al.

(10) Patent No.: US 8,870,477 B2
(45) Date of Patent: Oct. 28, 2014

(54) KEYBOARD WITH BACK-LIGHTED ULTRA-DURABLE KEYS

(75) Inventors: Baptiste Merminod, Lausanne (CH); Peter Mah, Hsinchu (TW); Eric Hsu, Zhubei (TW); Aaron Lee, Longjing Township, Taichung County (TW); Jero Chen, Taipei County (TW); Linus Chien, Jhuebel (TW); Eric Su, Pleasanton, CA (US)

(73) Assignee: Logitech Europe S.A., Romanel-sur-Morges (CH)

( * ) Notice: Subject to any disclaimer, the term of this patent is extended or adjusted under 35 U.S.C. 154(b) by 543 days.

(21) Appl. No.: 12/647,543

(22) Filed: Dec. 28, 2009

(65) Prior Publication Data

US 2010/0252407 A1 Oct. 7, 2010

Related U.S. Application Data (60) Provisional application No. 61/158,036, filed on Mar. 6, 2009, provisional application No. 61/117,297, filed on Nov. 24, 2008.

(51) Int. Cl.
*B41J 5/12* (2006.01)
*H01H 3/12* (2006.01)
*H01H 13/83* (2006.01)
*H01H 9/18* (2006.01)

(52) U.S. Cl.
CPC ......... *H01H 3/125* (2013.01); *H01H 2219/062* (2013.01); *H01H 2209/052* (2013.01); *H01H 13/83* (2013.01); *H01H 2009/187* (2013.01)
USPC ........... 400/490; 400/472; 400/493; 200/317; 200/345

(58) Field of Classification Search
USPC ........................................................ 400/490
See application file for complete search history.

(56) References Cited

U.S. PATENT DOCUMENTS

| | | | | |
|---|---|---|---|---|
| 2,741,433 A | * | 4/1956 | Cooper | 235/99 A |
| 3,818,485 A | * | 6/1974 | Harrison et al. | 341/31 |
| 4,096,368 A | * | 6/1978 | Grebner | 200/314 |
| 4,635,167 A | * | 1/1987 | Schlosser | 362/85 |
| 5,225,818 A | * | 7/1993 | Lee et al. | 200/314 |
| 5,280,145 A | * | 1/1994 | Mosier et al. | 200/314 |
| 5,349,503 A | * | 9/1994 | Blonder et al. | 362/623 |
| 5,612,692 A | * | 3/1997 | Dugas et al. | 341/22 |
| 5,975,711 A | * | 11/1999 | Parker et al. | 200/314 |
| 6,284,988 B1 | * | 9/2001 | Watanabe et al. | 200/314 |
| 6,462,294 B2 | * | 10/2002 | Davidson et al. | 200/314 |
| 6,743,993 B1 | * | 6/2004 | Clark et al. | 200/314 |
| 6,860,612 B2 | * | 3/2005 | Chiang et al. | 200/314 |

(Continued)

*Primary Examiner* — Jill Culler (74) *Attorney, Agent, or Firm* — Kilpatrick Townsend & Stockton LLP (57) ABSTRACT

A key for a keyboard includes a keycap having a top surface configured to be contacted for pressing the key down, and having a bottom. The keycap is substantially transparent. An intermediate layer is coupled to the bottom of the keycap. The intermediate layer is translucent and includes a top and a bottom. The top of the intermediate layer faces the bottom of the keycap. A character layer is positioned between the bottom of the keycap and the top of the intermediate layer. A resilient member is coupled to the bottom of the intermediate layer. The resilient member is translucent and is configured to direct light through the intermediate layer, through the character layer, and out from the keycap. The character layer is configured to be lighted for viewing through the keycap.

44 Claims, 5 Drawing Sheets

(56) References Cited

U.S. PATENT DOCUMENTS

| | | | |
|---|---|---|---|
| 7,027,036 B2 * | 4/2006 | Yang | 341/22 |
| 7,057,125 B1 * | 6/2006 | Tsai | 341/22 |
| 7,235,752 B1 * | 6/2007 | Chen et al. | 200/314 |
| 7,294,803 B2 * | 11/2007 | Lee et al. | 200/314 |
| 7,364,337 B2 * | 4/2008 | Park | 362/602 |
| 7,388,167 B2 * | 6/2008 | Liao et al. | 200/314 |
| 7,525,056 B2 * | 4/2009 | Chiba et al. | 200/314 |
| 7,608,792 B1 * | 10/2009 | Tsai | 200/314 |
| 7,736,042 B2 * | 6/2010 | Park et al. | 362/602 |
| 2005/0068202 A1 * | 3/2005 | Shipman | 341/22 |
| 2006/0254894 A1 * | 11/2006 | Jung et al. | 200/314 |
| 2008/0257699 A1 * | 10/2008 | Sung | 200/314 |

* cited by examiner

KEYBOARD WITH BACK-LIGHTED ULTRA-DURABLE KEYS

CROSS-REFERENCE TO RELATED APPLICATIONS

The present application claims the benefit of U.S. Provisional Patent Application No. 61/158,036, filed Mar. 6, 2009, entitled "Keyboard with Ultra-Durable Keys" and U.S. Provisional Patent Application No. 61/117,297, filed Nov. 24, 2008, entitled "Keyboard with Ultra-Durable Keys" both of which are commonly assigned and incorporated by reference herein.

BACKGROUND OF THE INVENTION

The present invention relates to peripheral devices for computer systems. More particularly, the present invention relates to a keyboard having back-lighted ultra-durable keys.

The use of computers is pervasive, and is becoming increasingly common all around the world. Numerous computers, along with their accompanying peripheral devices, are used in a multi-user environment, such as Internet cafes, schools, colleges etc. Especially in multi-user environments (where the computer and accompanying peripheral devices are used by users who do not own them), the usage of peripheral devices, such as keyboards and mice, can be quite frequent and rough on the devices. As a result, peripheral devices, and in particular input devices such as keyboards are subjected to significant wear. Wear is exacerbated by specific "heavy" users, such as gamers who can damage peripheral devices, such as keyboards, very quickly.

Specific examples of damage to keyboards includes: (i) key printing is often erased partially or fully, after a very short time (e.g., only a few weeks); (ii) dust or other foreign materials (e.g., food particles, cigarette ashes, liquids, and so on) enter between the keys in the keyboard, often leading to functional failure; and (iii) key switches are destroyed after a short time (e.g., only a few weeks).

In view of the foregoing discussed keyboard limitations, new keyboards and the like are needed wherein the keys of the keyboards are back-lighted, durable, and the key printing is not erased with rough and extended use.

BRIEF SUMMARY OF THE INVENTION

The present invention relates to peripheral devices for computer systems. More particularly, the present invention relates to a keyboard having back-lighted ultra-durable keys.

According to one embodiment of the present invention, a key for a keyboard includes a keycap having a top surface configured to be contacted for pressing the key down, and having a bottom. The keycap is substantially transparent. An intermediate layer is coupled to the bottom of the keycap. The intermediate layer is translucent and includes a top and a bottom. The top of the intermediate layer faces the bottom of the keycap. A character layer is positioned between the bottom of the keycap and the top of the intermediate layer. A resilient member is coupled to the bottom of the intermediate layer. The resilient member is translucent and is configured to direct light through the intermediate layer, through the character layer, and out from the keycap. The character layer is configured to be lighted for viewing through the keycap.

According to one specific embodiment of the key, the resilient member is coupled to a lightguide having a diffusion element. The diffusion element is optically coupled to the resilient member, and is configured to direct light from the lightguide into the resilient member. The diffusion element includes a lens or a roughened surface. The lightguide is optically coupled to a light generation device configured to send light into the lightguide. The light generation device may include a set of light emitting diodes.

According to another specific embodiment of the key, the bottom of the keycap includes a central portion corresponding to the character layer and a set of side portions, and the side portions of the keycap include a set of protrusions configured to mechanically couple the intermediate layer to the keycap. The character layer may be on the top of the intermediate layer, or on the bottom of the keycap. The character layer includes a layer of paint having a character formed in the layer of paint. The character may be formed by laser etching. According to one embodiment, the character layer includes a first paint layer and a second paint layer, and the first paint layer and the second paint layer have contrasting colors.

According to another specific embodiment of the key, the intermediate layer includes a light-dispersive material. The light dispersive material may include titanium oxide, nanoparticles, or bubbles. The top of the intermediate layer may be rough to disperse light emanating from the top.

According to one embodiment, a key for a keyboard includes a keycap and an intermediate layer coupled to the keycap. A character layer is positioned between the keycap and the intermediate layer. A resilient member is coupled to the intermediate layer and is configured to push the intermediate layer if the resilient member is deformed. The resilient member is configured to direct light through the intermediate layer, through the character layer, and out from the keycap. The character layer is configured to be lighted for viewing through the keycap.

According to one embodiment, a keyboard includes a plurality of keys. Each key includes: i) a keycap; ii) an intermediate layer coupled to the keycap; iii) a character layer positioned between the keycap and the intermediate layer; and iv) a resilient member coupled to the intermediate layer and configured to push the intermediate layer if the resilient member is deformed. The keyboard further includes a lightguide having a plurality of diffusion elements. The plurality of diffusion elements are respectively optically coupled to the plurality of resilient members. The plurality of diffusion elements are configured to direct light: i) from the lightguide into the resilient members, ii) through the intermediate layers, iii) through the character layers, and iv) out from the keycaps. The character layers are configured to be lighted for viewing through the keycaps.

According to one embodiment, a key for a keyboard includes a top plate that is substantially transparent and is configured to be contacted for pressing the key down. An intermediate layer is coupled to a bottom of the top plate. The intermediate layer is translucent and includes a top and a bottom. The top of the intermediate layer faces the bottom of the top plate. A side portion of the key surrounds at least a portion of side portions of the top plate and side portions of the intermediate layer. A character layer is positioned between the bottom of the top plate and the top of the intermediate layer. A resilient member is coupled to the bottom of the intermediate layer. The resilient member is translucent and is configured to direct light through the intermediate layer, through the character layer, and out from the top plate. The character layer is configured to be lighted for viewing through the top plate. According to one specific embodiment, the top plate includes a transparent layer disposed over the character layer, and a translucent paint layer disposed under the character layer. The top plate may include a glue layer disposed between the character layer and the intermediate layer, and may be configured to couple the top plate to the intermediate layer. Alternatively, the top plate is configured to mechanically couple to the intermediate plate.

According to one embodiment, a keyboard includes a plurality of keys where each key includes a character layer coupled thereto. A lightguide is disposed under the keys. The light guide is configured to direct light into the keys and through the character layer to light the character layer for viewing by a user. The light guide includes a top surface facing the keys and a bottom surface facing away from the keys. A plurality of ring structures is disposed on the bottom surface and extend from the bottom surface. Each ring structure is disposed below one of the keys. According to one specific embodiment, the plurality of ring structures is integrally formed with the lightguide. According to an alternative embodiment, the plurality of ring structures is a paint layer. Each ring structure may have a surface that is curved, and the curve may be parabolic.

Each of the ring structures is configured to direct light up from the bottom of the lightguide, into a body of the lightguide, and out through the top surface of the lightguide to illuminate the key. Pluralities of surface features may be disposed on the bottom surface, and extend from the bottom surface. Each of the ring features surrounds one of the pluralities of surface features. Each of the surface features has a curved surface, which may be parabolic.

These and other embodiments of the present invention are described in more detail in conjunction with the text below and the attached figures.

BRIEF DESCRIPTION OF THE DRAWINGS

FIGS. 2D-2F are a time ordered sequence of events of first paint layer 110 and second paint layer 110 being formed on under surface a of keycap;

DETAILED DESCRIPTION OF SELECT EMBODIMENTS OF THE INVENTION

The present invention provides a peripheral device for computer systems. More particularly, the present invention provides a keyboard having ultra-durable keys.

One aspect of the present invention relates to making the printing on the keys of a keyboard stay without wearing off. The printing on the keys includes the characters, symbols, and text, which provides information for the functions the keys perform when pressed by a user. In one embodiment, this is accomplished by not having the user's fingers touch the printing directly, as on conventional keyboards, but rather having a protective covering between the printing and the part of the key that is contacted by the user's fingers. The protective covering may be transparent or translucent, so that the user can see the printing on the key through the protective coating. According to one embodiment, the printing is back lighted so that a character in the printing may be visible in low light environments.

Figure 1:
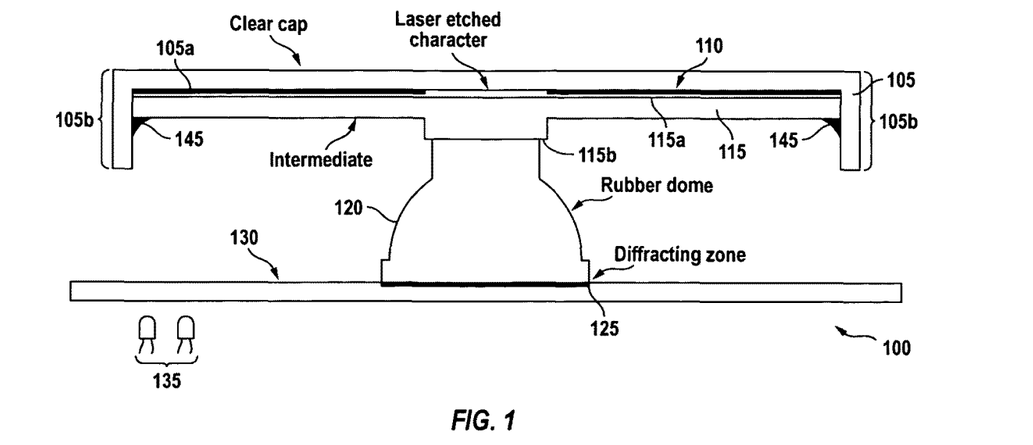
FIG. 1 is a simplified schematic of a key according to one embodiment of the present invention.

FIG. 1 is a simplified schematic of a key 100 according to one embodiment of the present invention. Key 100 may be configured for use with a keyboard or the like. Key 100 includes a keycap 105 where the user's fingers cannot touch a character layer 110 directly so that a printed character in the character layer will not be erased with repeated contact with a user's fingers. More specifically, key 100 includes keycap 105, character layer 110, an intermediate layer 115, a resilient member 120, a diffusion layer 125, a lightguide 130, and a light source 135 (e.g., a set of light emitting diode) configured to send light into the lightguide. A set as referred to herein includes one or more elements.

Keycap 105 forms an upper portion of the key and may be clear or substantially translucent. Keycap 105 may be formed from plastic or the like. According to one embodiment, character layer 110 may be disposed on an "under" surface 105*a* of the keycap. Character layer 110 may include at least a first paint layer and a second paint layer. The first paint layer may be a layer of black paint that may be painted, printed (e.g., tampo printed), or the like onto under surface 105*a* of key 105. According to one embodiment, the first paint layer may be etched, such as by a laser, to form a character in the first paint layer. The character may be any character typically found on a key of a keyboard. It will be understood by those of skill in the art that the lightguide may extend beneath a number of keys on a keyboard and provide light to the keys.

Figure 2A:
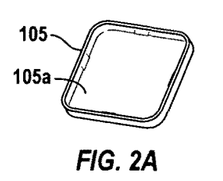
FIG. 2A is a simplified view of the under surface of the keycap not having any paint on the under surface.
Figure 2B:
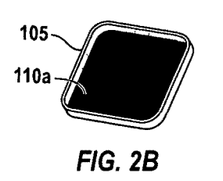
FIG. 2B is a simplified view of the under surface having the first layer of paint formed on the under surface.
Figure 2C:
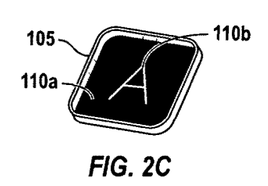
FIG. 2C is a simplified view of the under surface where a character (e.g., character "A") is formed (e.g., by laser etching) in the first paint layer.

FIGS. 2A-2C are a time ordered sequence of events of a first paint layer 110*a* being formed on keycap 105, and a character 110*b* being formed in the first paint layer. More specifically, FIG. 2A is a simplified bottom view of keycap 105 not having paint on under surface 105*a*. FIG. 2B is a simplified bottom view of keycap 105 having the first paint layer 110*a* formed on under surface 105*a*. FIG. 2C is a simplified bottom view of keycap 105 where character 110*b* (e.g., character "A") is formed in the first paint layer. The character may be formed by laser etching or the like. According to one specific embodiment, the second paint layer is a layer of white paint formed over the first paint layer. The second paint layer may be painted over the first paint layer after the character is etched in the first paint layer.

Figure 2D:
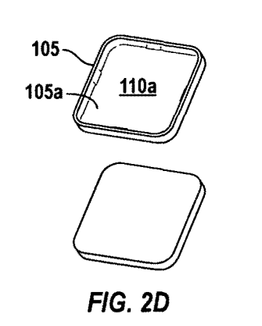
Figure 2E:
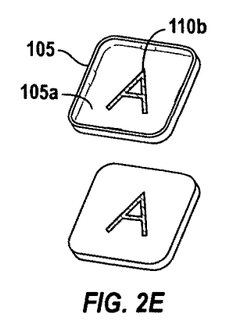

FIGS. 2D-2F are a time ordered sequence of events of first paint layer 110*a* and second paint layer 110*c* being formed on under surface 105*a* of keycap 105. Each of FIGS. 2D-2F includes a top view and a bottom view of the keycap. The top image (towards the top of the page) of the keycap in each of FIGS. 2D-2F is a bottom view of the keycap, and the bottom image (towards the bottom of the page) in each of FIGS. 2D-2F is a top view of the keycap. More specifically, FIG. 2D shows the first paint layer 110*a* formed on the under surface of the keycap. FIG. 2E shows character 110*b* formed in the first paint layer. FIG. 2F shows second paint layer 110*c* formed over first paint layer 110A. The second paint layer is formed at least over the character formed in the first paint layer.

Referring again to FIG. 1, intermediate layer 115 may be coupled to the keycap to enclose the character layer between under surface 105a of the keycap and an "upper" surface 115a of the intermediate layer. Keycap 105 and intermediate layer 115 may be bounded by glue, ultrasonic welding, or the like. According to one specific embodiment, keycap 105 includes a set of tabs 145 disposed on sides 105b of keycap 105. Tabs 145 may be generally triangular in shape, and may be configured to mechanically couple intermediate layer 115 to keycap 105.

According to an alternative embodiment, the second paint layer (e.g., white paint layer) may be painted onto upper surface 115a of intermediate layer 115. According to another alternative embodiment, first paint layer (e.g., black paint layer) may be painted over the second paint layer onto the upper surface 115a of intermediate layer 115. Thereafter, the first paint layer may be etched to form a character in the first paint layer. According to this embodiment, the entire character layer 110 may be formed on the upper surface of the intermediate layer.

According to another alternative embodiment, character layer 110 includes the first paint layer painted directly onto the upper surface of the intermediate layer. The first paint layer may be etched to form a character in the paint layer. The color of the first paint layer may contrast the color of the top of the intermediate layer.

According to one embodiment, resilient member 120 is formed of rubber or the like and is substantially translucent. An upper portion of the resilient member is coupled to an under surface 115b of intermediate layer 115, and a lower portion of the resilient member is coupled to lightguide 130 at diffusion layer 125. The resilient member is configured to deform if the keycap is pressed downward so that the cap may move downward. The resilient member may be configured to rebound to push the keycap back up after the keycap is pressed.

Diffusion layer 125 is configured to direct light upward from the lightguide into the resilient member. Diffusion layer 125 may include a lens, a roughened surface (sanded, pitted, etc.) of the lightguide, or the like. The resilient member is translucent and is configured to direct light from the diffusion layer upward into the intermediate layer, which is also translucent. The intermediate layer is configured to direct light received from the resilient member up through upper surface 115a. According to one embodiment, upper surface 115a may be a roughened surface to enhance dispersion of the light at the upper surface. According to a specific embodiment where the second paint layer (e.g., white paint layer) is formed on the upper surface 115a of the intermediate layer, the second paint layer may also be configured to disperse light from the intermediate layer. The dispersion of light from the intermediate layer serves to illuminate the character formed in the first paint layer substantially uniformly.

According to a further embodiment, the intermediate layer may include a light-dispersive material (not shown). The intermediate layer may be formed of plastic or the like and may include the light-dispersive material. The light-dispersive material may include titanium oxide, particulate matter (e.g., nano-particles), bubbles (e.g., micro-bubbles), or the like. The light-dispersive material is configured to scatter light in the intermediate layer so that light exiting the intermediate layer through upper surface 115a illuminates the character formed in the first paint layer substantially uniformly. Light passing out from the first paint layer though the keycap forms an image of the character, which is visible to a user viewing the key. Because the keycap is substantially transparent, the light passes through the character and outward from the keycap. Thereby, the character may be a lighted character that is visible in a low light environment, such as a darkened room.

Figure 3:
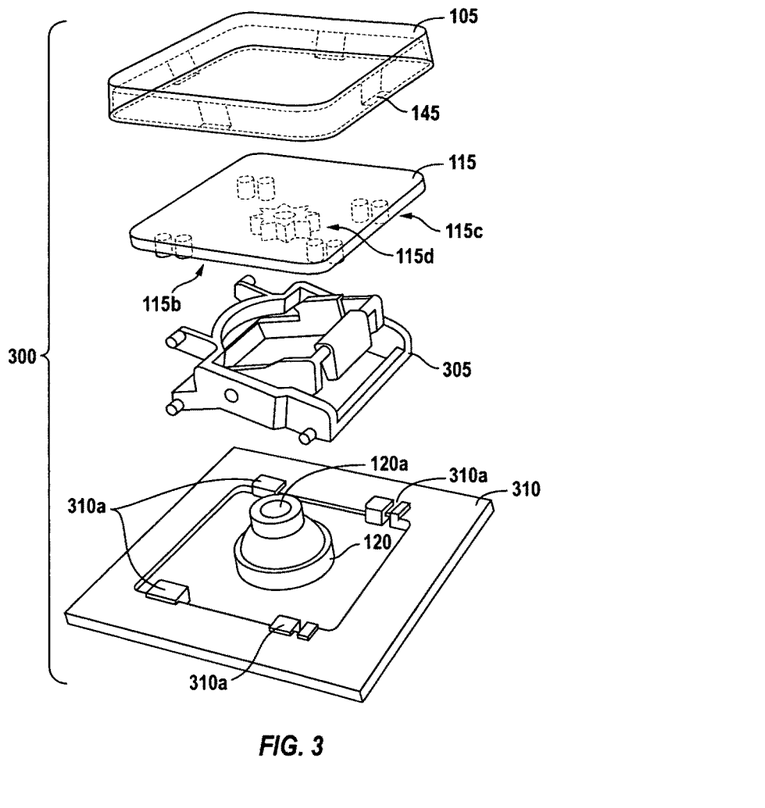
FIG. 3 is an exploded view of a key according to another embodiment of the present invention.

FIG. 3 is an exploded view of a key 300 according to another embodiment of the present invention. FIG. 3 is generally a top-perspective view of key 300. The same number scheme used above for FIG. 1 is used to identify the same or substantially the same elements in FIG. 3. Key 300 is similar to key 100 described above, but differs from key 100 in that key 300 includes a scissor mount 305, which may be mounted to a plate 310 and coupled to intermediate layer 115. Plate 310 may be a portion of an extended plate, which extends throughout a keyboard. Plate 310 may be metal and may include various structures (such as hook structures) 310a to couple to the base of the scissor mount. The lightguide 130 (not shown in FIG. 3) and diffusion layer 125 (not shown in FIG. 3) may be disposed under plate 310. According to one embodiment, resilient member 120 is coupled to the lightguide at the diffusion layer and is configured to extent through the scissor mount to contact the intermediate layer 115. The intermediate layer 115 may include various mount structures 115c on the under surface 115b to couple to the scissor mount. The intermediate layer 115 may also include a structure 115d (e.g., a star structure) on under surface 115b to couple the resilient member to the intermediate layer. The star structure may fit in an opening 120a, which is formed at the top of the resilient member. It is noted that intermediate layer 115 is shown in FIG. 3 as see through so that mount structures 115c may be seen from a top view of the intermediate layer. Scissor mount 305 is configured to couple to the intermediate plate to guide the keycap 105 and the intermediate layer 115 substantially vertically up and down as the keycap is pressed and released. The scissor mount, in addition to the resilient member, may provide a spring force on the intermediate plate and keycap to push the intermediate plate and keycap upward after the keycap is pressed and released. Otherwise, the functionality of key 300 is substantially similar to key 100 described above.

Figure 4:
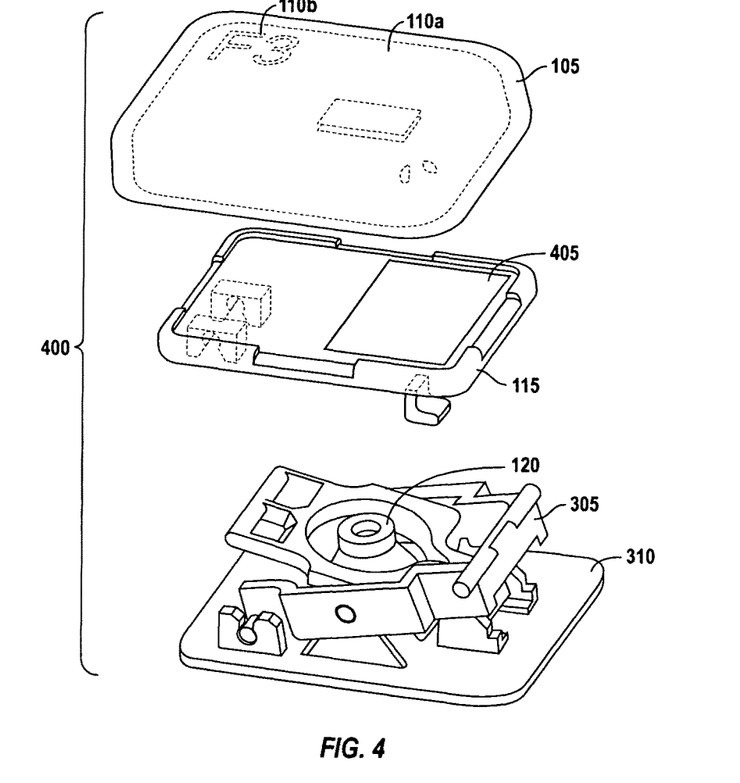
FIG. 4 is a simplified schematic of a key according to another embodiment of the present invention.

FIG. 4 is an exploded view of a key 400 according to another embodiment of the present invention. The same number schema used above for FIGS. 1 and 3 is used to identify the same or substantially the same elements in FIG. 4. Key 400 is similar to key 300 described above, but differs from key 300 in that key 400 includes a colored film 405 disposed on intermediate layer 115. The colored film may be translucent and may be a different color than the plastic (or the like) forming the intermediate layer. The colored film may be mounted on the upper surface 115a of the intermediate layer. As light passes upward and through the intermediate layer and the colored film, the intermediate layer is configured to illuminate a first character (e.g., "F3") with a first color (e.g., white), and the colored film is configured to illuminate a second character (e.g., a rectangular region) with a second color (e.g., orange). While key 400 shown in FIG. 4 includes one colored film 405, the key may include more than one colored film so that the characters of the key may be illuminated with those colors of the colored films. Otherwise, the functionality of key 400 is substantially similar to key 100 described above.

Figure 5:
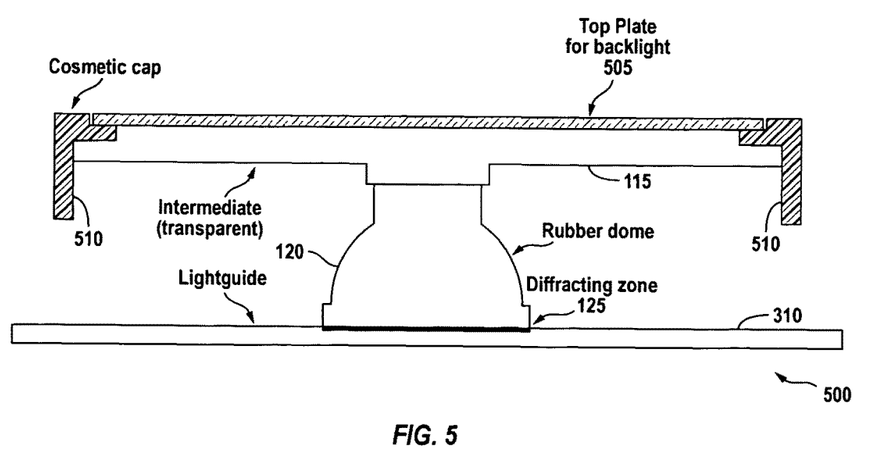
FIG. 5 is a simplified cross-section view of a key according to another embodiment of the present invention.

FIG. 5 is a simplified cross-section view of a key 500 according to another embodiment of the present invention. Key 500 is substantially similar to the keys described above except that key 500 includes top plate 505 coupled to intermediate layer 115, and a side portion 510, which couples to both the top plate and the intermediate layer. Side portion 510 may be mechanically coupled to the intermediate layer by clips or the like as described above. Side portion 510 of key 500 forms an outer portion of the side of the key. Side portion 510 surrounds at least a portion of the sides of the top plate and the sides of the intermediate layer. According to one embodiment, side portion 510 includes a shelf 515 that extends laterally with respect to the top of the key. Shelf 515 is coupled to both the top plate and the intermediate layer 115. Side portion 510 may extend downward substantially perpendicular to the top plate as shown in FIG. 5, or may be beveled.

Figure 6:
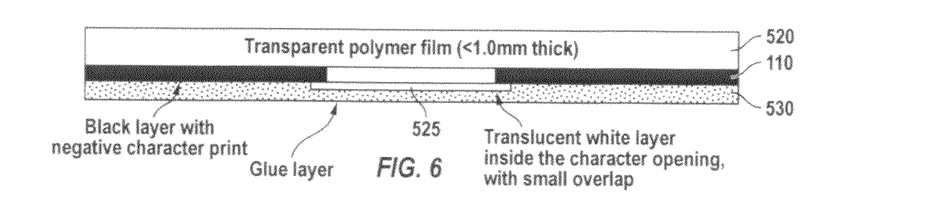
FIG. 6 is a further detailed schematic of top plate according to one embodiment of the present invention.

FIG. 6 is a further detailed schematic of top plate 505 according to one embodiment of the present invention. Top plate 505 includes a transparent layer 520, a character layer 110, a translucent paint layer 525, and a glue layer 530. Transparent layer 520 may be a plastic type film (e.g., a polymer film). The transparent layer may be about 1 millimeter thick or less. The transparent layer may be glued to the intermediate layer by the glue layer. Character layer 110 may have each of the features described above. For example, the character layer 110 may be printed (e.g., tampo printed) onto transparent layer 520. The character may be a black character with a white background, or a white character surrounded by the substantially black printing. According to an alternative embodiment, the character layer may be a paint layer and the character may be etched (e.g., laser etched) into the paint layers.

According to one embodiment, the translucent paint layer may be a white paint layer or the like. The translucent paint layer may be wider than the width and height of the character, or wider than the width and height of the background of the character. The glue layer may be substantially transparent. According to one embodiment, light from the lightguide 130 is configured to travel trough diffusion layer 125, through resilient member 120, through intermediate layer 115, through the character formed in character layer 110, and out through transparent layer 520 where the character may be visible by a user.

Figure 7:
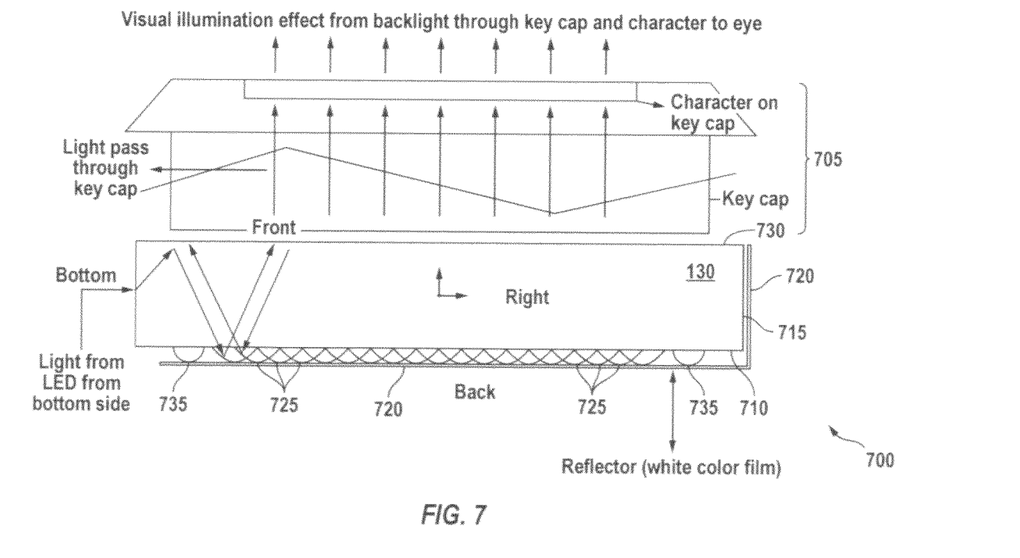
FIG. 7 is a simplified cross-section view of a portion of a keyboard according to another embodiment of the present invention.

FIG. 7 is a simplified cross-section view of a portion of a keyboard 700 according to another embodiment of the present invention. Keyboard 700 includes a plurality of keys of which one key 705 is shown in FIG. 7. Each of the keys included in keyboard 700 may be configured similarly to key 705. Key 705 may be any of the key embodiments described above. According to one embodiment, lightguide 130 is wrapped on a bottom surface 710 and a side surface 715 with a reflector 720. Reflector 720 may be a white color film (e.g., white plastic, white paint, etc.), a metallic film, or the like. The reflector is configured to direct light escaping from the bottom surface and the side surface of the lightguide back into the body of the lightguide.

Figure 8:
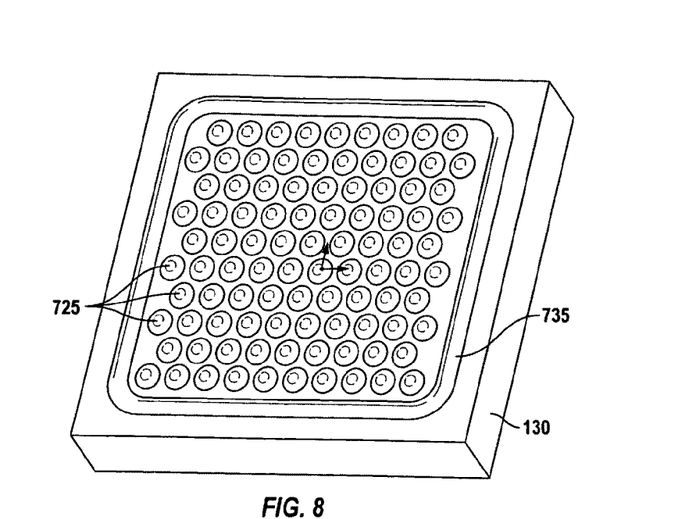
FIG. 8 is a perspective view of the plurality of surface features that may be disposed under a key according to one embodiment of the present invention.
Figure 9:
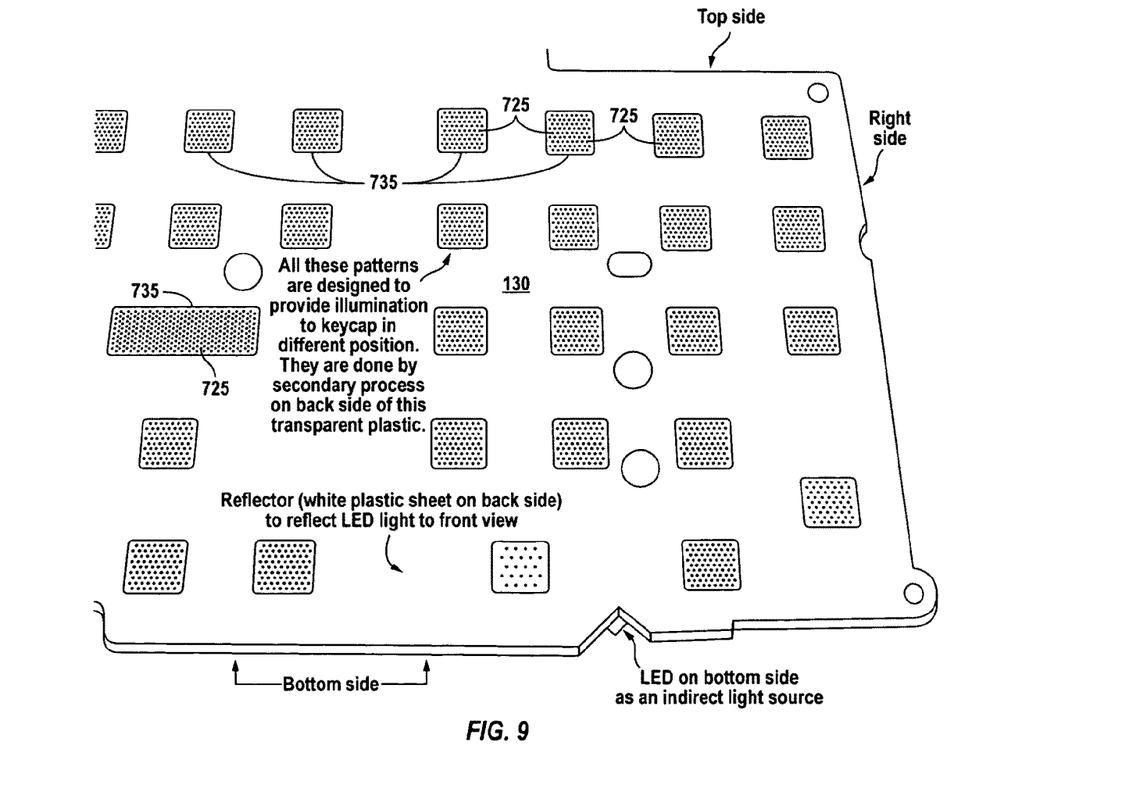
FIG. 9 is an extended view of a portion of a lightguide and shows surface features for a number of key positions.

According to one embodiment, lightguide 130 includes a plurality of surface features 725 that extend outward from the bottom of the lightguide. FIG. 8 is a perspective view of the plurality of surface features 725 that may be disposed under key 705. Note that FIG. 8 shows a bottom view of the lightguide. FIG. 9 is an extended view of a portion of a lightguide and shows surface features 725 for a number of key positions.

The surface features are configured to direct light out through a top surface 730 of the lightguide and out through the key to light the character formed in the character layer of the key. The surface features may be configured to reflect light upward and to focus the reflected light. According to one embodiment, the light focused from the surface features strikes the top surface of the waveguide at a given angle, which may be less than the critical angle at which total internal reflection occurs at the top surface.

Each of the surface features may have a curved surface as shown in FIG. 8 or may be substantially flat. For example, each surface feature may have a parabolic shape or the like. The surface features may be cylindrical. According to one embodiment, the plurality of surface features is integrally formed with the lightguide. According to an alternative embodiment, the surface features are formed on the bottom surface and may be painted or printed on the bottom surface. Alternatively, the surface features may be roughened sections of the bottom surface of the lightguide. Portions of the light guide surrounding the roughened section may be relatively smooth compared to the roughened sections. FIG. 9 is an image of a lightguide having several pluralities of surface features 725 where each plurality of surface features is proximate to a position of a key. According to the specific embodiment of the lightguide shown in FIG. 9, the surface features are painted or printed onto the bottom surface of the light guide and may be substantially flat.

According to a further embodiment, lightguide 130 includes a ring feature 735. Ring feature 735 extends from the bottom of the lightguide. The ring feature may be integrally formed with the lightguide or may be applied to the bottom surface of the lightguide by painting, printing, or the like. Ring feature 735 is configured to direct light up from the bottom of the lightguide, into the lightguide body, and out through top surface 730 of the lightguide to illuminate the key. The ring feature may have a rounded surface. According to one embodiment, the rounded surface may be parabolic (in a cross-sectional view of the ring feature). Alternatively, if the ring features (and/or surface features) are painted or printed, the ring feature (and/or the surface features) may be substantially two dimensional. According to one embodiment, the ring feature is configured to provide additional illumination at the sides of the key as compared to the plurality of surface features 725. By providing additional illumination at the sides of the key, any character formed in the character layer may be substantially uniformly illuminated. The ring feature may be substantially square as shown or may have other advantage shapes, such as rectangular, rounded, or the like. While the ring feature is shown as having a curved profile, the ring feature may have other profiles, such as rectangular or the like.

While particular embodiments and applications of the present invention have been illustrated and described, it is to be understood that the invention is not limited to the precise construction and components disclosed herein. Various other modifications, changes, and variations which will be apparent to those skilled in the art may be made in the arrangement, operation and details of the method and apparatus of the present invention disclosed herein, without departing from the spirit and scope of the invention as defined in the following claims.

What is claimed is:

1. A key for a keyboard comprises:
    a keycap having a top surface configured to be contacted for pressing the key down, and having a bottom, wherein the keycap is substantially transparent;
    an intermediate layer coupled to the bottom of the keycap, wherein the intermediate layer is translucent and includes a top and a bottom, and wherein the top of the intermediate layer faces the bottom of the keycap;
    a character layer positioned between the bottom of the keycap and the top of the intermediate layer;
    a resilient member coupled to the bottom of the intermediate layer, wherein the resilient member is translucent and is configured to direct light through the intermediate layer, through the character layer, and out from the keycap, and the character layer is configured to be lighted for viewing through the keycap;

a lightguide coupled to the resilient member and having a body, a bottom surface, a side surface, and a diffusion element optically coupled to the resilient member and configured to direct light from the lightguide into the resilient member, wherein the lightguide includes a plurality of surface features disposed on and protruding downward from the bottom surface of the lightguide, and wherein the surface features have a parabolic shape and are configured to reflect light upward and to focus the reflected light out through the top surface of the lightguide and out through the key to light the character formed in the character layer of the key; and a reflector wrapped around the bottom surface and side surface of the lightguide, the reflector operable to direct light escaping from the bottom surface and the side surface of the lightguide back into the body of the lightguide.

2. The key of claim 1, wherein the diffusion element includes a lens.

3. The key of claim 1, wherein the diffusion element includes a roughened surface.

4. The key of claim 1, wherein the lightguide is optically coupled to a light generation device configured to send light into the lightguide.

5. The key of claim 4, wherein the light generation device includes a set of light emitting diodes.

6. The key of claim 1, wherein:
the bottom of the keycap includes a central portion corresponding to the character layer and a set of side portions, and
the side portions of the keycap include a set of protrusions configured to mechanically couple the intermediate layer to the keycap.

7. The key of claim 1, wherein the character layer is on the top of the intermediate layer.

8. The key of claim 1, wherein the character layer is on the bottom of the keycap.

9. The key of claim 1, wherein the character layer includes a layer of paint having a character formed in the layer of paint.

10. The key of claim 1, wherein the character is formed by laser etching.

11. The key of claim 1, wherein:
the character layer includes a first paint layer and a second paint layer, and
the first paint layer and the second paint layer have contrasting colors.

12. The key of claim 1, wherein the intermediate layer includes a light-dispersive material.

13. The key of claim 12, wherein the light-dispersive material is titanium oxide, nano-particles, or bubbles.

14. The key of claim 1, wherein the top of the intermediate layer is rough to disperse light emanating from the top.

15. A key for a keyboard comprises:
a keycap;
an intermediate layer coupled to the keycap;
a character layer positioned between the keycap and the intermediate layer;
a resilient member coupled the intermediate layer and configured to push the intermediate layer if the resilient member is deformed, wherein
the resilient member is translucent and configured to direct light through the intermediate layer, through the character layer, and out from the keycap, and
the character layer is configured to be lighted for viewing through the keycap;

a lightguide coupled to the resilient member and having a body, a bottom surface, a side surface, and a diffusion element optically coupled to the resilient member and configured to direct light from the lightguide into the resilient member, wherein the lightguide includes a plurality of surface features disposed on and protruding downward from the bottom surface of the lightguide, and wherein the surface features have a parabolic shape and are configured to reflect light upward and to focus the reflected light out through the top surface of the lightguide and out through the key to light the character formed in the character layer of the key; and a reflector wrapped around the bottom surface and side surface of the lightguide, the reflector operable to direct light escaping from the bottom surface and the side surface of the lightguide back into the body of the lightguide.

16. The key of claim 15, wherein the diffusion element includes a lens.

17. The key of claim 15, wherein the diffusion element includes a roughened surface.

18. The key of claim 15, wherein the lightguide is optically coupled to a light generation device configured to send light into the lightguide.

19. The key of claim 18, wherein the light generation device includes a set of light emitting diodes.

20. The key of claim 15, wherein:
a bottom of the keycap includes a central portion corresponding to the character layer and a set of side portions, and
the side portions of the keycap include a set of protrusions configured to mechanically couple the intermediate layer to the keycap.

21. The key of claim 15, wherein the character layer is on a top surface of the intermediate layer.

22. The key of claim 15, wherein the character layer is on a bottom surface of the keycap.

23. The key of claim 15, wherein the character layer includes a layer of paint having a character formed in the layer of paint.

24. The key of claim 15, wherein the character is formed by laser etching.

25. The key of claim 15, wherein:
the character layer includes a first paint layer and a second paint layer, and
the first paint layer and the second paint layer have contrasting colors.

26. The key of claim 15, wherein the intermediate layer includes a light-dispersive material.

27. The key of claim 26, wherein the light-dispersive material is titanium oxide, nano-particles, or bubbles.

28. The key of claim 15, wherein the top of the intermediate layer is rough to disperse light emanating from the top.

29. The keyboard comprising:
a plurality of keys, wherein each key includes:
a keycap;
an intermediate layer coupled to the keycap;
a character layer positioned between the keycap and the intermediate layer;
a translucent resilient member coupled to the intermediate layer and configured to push the intermediate layer if the resilient member is deformed;
a lightguide having a plurality of diffusion elements, which are respectively optically coupled to the plurality of resilient members and are configured to direct light:
i) from the lightguide into the resilient members,
ii) through the intermediate layers, iii) through the character layers, and
iv) out from the keycaps, wherein the character layers are configured to be lighted for viewing through the keycaps, and wherein the lightguide includes a body, bottom surface, and a side surface, wherein the lightguide includes a plurality of surface features disposed on and protruding downward from the bottom surface of the lightguide, and wherein the surface features have a parabolic shape and are configured to reflect light upward and to focus the reflected light out through the top surface of the lightguide and out through the key to light the character formed in the character layer of the key; and a reflector wrapped around the bottom surface and side surface of the lightguide, the reflector operable to direct light escaping from the bottom surface and the side surface of the lightguide back into the body of the lightguide.

30. The key of claim 29, wherein each of the diffusion elements includes a lens.

31. The key of claim 29, wherein each of the diffusion elements includes a roughened surface.

32. The key of claim 29, wherein the lightguide is optically coupled to a light generation device configured to send light into the lightguide.

33. A key for a keyboard comprises:
a top plate that is substantially transparent and is configured to be contacted for pressing the key down;
an intermediate layer coupled to a bottom of the top plate, wherein the intermediate layer is translucent and includes a top and a bottom, and wherein the top of the intermediate layer faces the bottom of the top plate;
a side portion surrounding at least a portion of side portions of the top plate and side portions of the intermediate layer;
a character layer positioned between the bottom of the top plate and the top of the intermediate layer;
a resilient member coupled to the bottom of the intermediate layer, wherein:
a) the resilient member is translucent and is configured to direct light through the intermediate layer, through the character layer, and out from the top plate, and
b) the character layer is configured to be lighted for viewing through the top plate;
a lightguide coupled to the resilient member and having a body, a bottom surface, a side surface, and a diffusion element optically coupled to the resilient member and configured to direct light from the lightguide into the resilient member, wherein the lightguide includes a plurality of surface features disposed on and protruding downward from the bottom surface of the lightguide, and wherein the surface features have a parabolic shape and are configured to reflect light upward and to focus the reflected light out through the top surface of the lightguide and out through the key to light the character formed in the character layer of the key; and a reflector wrapped around the bottom surface and side surface of the lightguide, the reflector operable to direct light escaping from the bottom surface and the side surface of the lightguide back into the body of the lightguide.

34. The key of claim 33, wherein the top plate includes a transparent layer disposed over the character layer, and a translucent paint layer disposed under the character layer.

35. The key of claim 33, wherein the top plate includes a glue layer disposed between the character layer and the intermediate layer, and wherein the glue layer is configured to couple the top plate to the intermediate layer.

36. The key of claim 33, wherein the top plate is configured to mechanically couple to the intermediate plate.

37. The key of claim 33, wherein the diffusion element includes a lens.

38. The key of claim 33, wherein the diffusion element includes a roughened surface.

39. A keyboard comprises:
a plurality of keys wherein each key includes a character layer coupled thereto;
a lightguide disposed under the keys and configured to direct light into the keys and through the character layer to light the character layer for viewing by a user, wherein the light guide includes a top surface facing the keys and a bottom surface facing away from the keys;
a plurality of ring structures disposed on the bottom surface and extending from the bottom surface, wherein each ring structure is disposed below one of the keys, wherein each of the ring structures is configured to provide additional illumination at the sides of the key; and
pluralities of surface features disposed on the bottom surface of the lightguide, wherein each of the plurality of surface features extend downward from the bottom surface of the lightguide, wherein the surface features have a parabolic shape and are configured to reflect light upward and to focus the reflected light out through the top surface of the lightguide and out through the key to light the character formed in the character layer of the key.

40. The keyboard of claim 39, wherein the plurality of ring structures is integrally formed with the lightguide.

41. The keyboard of claim 39, wherein the plurality of ring structures is a paint layer.

42. The keyboard of claim 39, wherein each ring structure has a surface that is curved.

43. The keyboard of claim 42, wherein the curve is parabolic.

44. The keyboard of claim 39 wherein the pluralities of surface features extend from the bottom surface, wherein each of the ring features surrounds one of the pluralities of surface features.

* * * * *